United States Patent
Vivanco (10) Patent No.: US 9,706,556 B1
(45) Date of Patent: Jul. 11, 2017

(54) LIMITING CARRIER AGGREGATION FOR A WIRELESS DEVICE

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

(*) Notice: Subject to any disclaimer, the term of this patent is extended or adjusted under 35 U.S.C. 154(b) by 150 days.

(21) Appl. No.: 14/840,212

(22) Filed: Aug. 31, 2015

(51) Int. Cl.
*H04W 24/00* (2009.01)
*H04W 72/04* (2009.01)
*H04W 28/02* (2009.01)
*H04W 48/02* (2009.01)

(52) U.S. Cl.
CPC ... *H04W 72/0486* (2013.01); *H04W 28/0252* (2013.01); *H04W 48/02* (2013.01)

(58) Field of Classification Search
CPC .............................................. H04W 72/0486
See application file for complete search history.

(56) References Cited

U.S. PATENT DOCUMENTS

| 7,027,415 B1* | 4/2006 | Dahlby | H04W 28/20 370/322 |
| 2013/0136015 A1 | 5/2013 | Ojala et al. | |
| 2014/0112282 A1* | 4/2014 | Wijting | H04L 5/0098 370/329 |
| 2014/0247796 A1* | 9/2014 | Ouchi | H04L 5/0053 370/329 |

FOREIGN PATENT DOCUMENTS

WO     2014/161576 A1    10/2014

* cited by examiner

*Primary Examiner* — Gerald Smarth (57) ABSTRACT

Systems and methods for limiting carrier aggregation for a wireless device are provided. A high mobility wireless device can be identified based on a number of carrier aggregation messages provided for the high mobility wireless device. An access node can receive a wireless device ID associated with the high mobility wireless device. The access node can obtain a wireless device ID from a wireless device being served by the access node. The wireless device ID of the served wireless device is compared with the wireless device ID of the high mobility wireless device. Carrier aggregation is denied based on the comparison.

16 Claims, 5 Drawing Sheets

LIMITING CARRIER AGGREGATION FOR A WIRELESS DEVICE

TECHNICAL BACKGROUND

Telecommunication systems, such as cellular networks or other wireless networks, may provide a plurality of cells that a wireless device may use to communicate with a network. The various cells may provide different capabilities for communication with the network, such as varying speeds for data transmission and carrier aggregation. In carrier aggregation, an access node provides the wireless device with more than one carrier to increase the bandwidth available for the wireless device. Carrier aggregation is typically provided by the access node after the wireless device enters a service area.

There is typically a delay between the time the wireless device enters the service area and the time the carrier aggregation is provided. For wireless devices with little or no mobility, the delay does not adversely affect the experience of the end use of the wireless device. However, for high mobility devices, the carrier aggregation may be provided shortly before the wireless device transfers from the serving cell to a target cell. That is, the wireless device traverses a substantial portion of the serving cell before the carrier aggregation is provided to the wireless device. As a result, a resource demand is placed on the access node without the service improvements associated with carrier aggregation.

OVERVIEW

In an embodiment, a method for limiting carrier aggregation for a wireless device includes identifying a high mobility wireless device based on a number of carrier aggregation messages provided for the high mobility wireless device. A wireless device ID associated with the high mobility wireless device is provided. A wireless device ID is obtained from a wireless device being served by the access node. The wireless ID of the served wireless device is compared to the wireless device ID of the high mobility wireless device. Carrier aggregation is denied based on the comparison.

In an embodiment, a method for limiting carrier aggregation for a wireless device includes obtaining a wireless device ID from a wireless device. A number of carrier aggregation messages associated with the wireless device ID is determined. The number of carrier aggregation messages is compared with a carrier aggregation threshold. Based on the comparison, the wireless device is identified as a high mobility wireless device.

In an embodiment, a system for limiting carrier aggregation for a wireless device comprises an access node configured to obtain a wireless device ID from a wireless device being served by the access node and a network node in communication with the access node. The network node is configured to determine a number of carrier aggregation messages associated with the wireless device ID, compare the number of carrier aggregation messages with an aggregation threshold, and based on the comparison, determine that the wireless device is a high mobility wireless device.

DETAILED DESCRIPTION

The various exemplary embodiments described herein contemplate systems and methods for limiting carrier aggregation for a wireless device. Carrier aggregation messages are sent by access nodes to a network node, such as a controller node. A location, velocity, and wireless ID may also be sent to the network node. The network node determines if the wireless device is a high mobility wireless device based on the number of carrier aggregation messages. The network node provides the wireless ID to a plurality of access nodes proximate the access node serving the identified high mobility wireless device. A period of time the high mobility wireless device is to be denied carrier aggregation may also be provided. Carrier aggregation may be denied to the high mobility wireless device when the high mobility wireless device is transferred to one of the plurality of access nodes.

Figure 1:
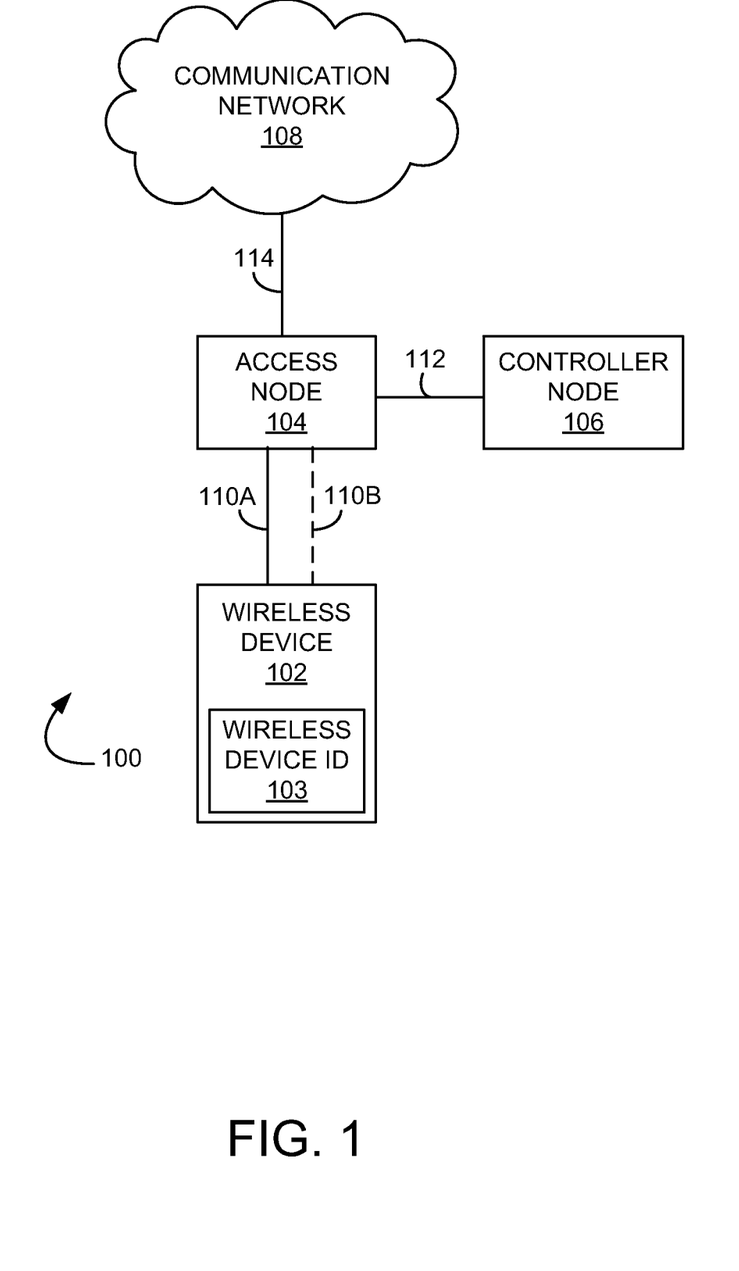
FIG. 1 illustrates an exemplary system for limiting carrier aggregation for a wireless device.

FIG. 1 illustrates an exemplary communication system 100 for limiting carrier aggregation for a wireless device. Communication system 100 is a network that can provide wireless communication to wireless device 102. Communication network 108 is a network that can provide communication between access node 104 and other wired or wireless networks. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. Wireless device 102 includes a wireless device ID 103 (e.g., MACID IMSI). It is noted that while one wireless device is illustrated in FIG. 1 as being in communication with access node 104, any number of wireless devices can be implemented according to various exemplary embodiments disclosed herein.

The wireless interface of wireless device 102 can include one or more transceivers for transmitting and receiving data over communication system 100. Each transceiver can be associated with a different frequency band, the same or different radio access technologies, and/or the same or different network providers. For example, wireless device 102 can include a transceiver associated with at least one wireless cellular protocol and/or other types of wireless communication. For example, a transceiver can be associated with code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), etc.

Wireless device 102 can be in communication with access node 104 through communication links 110A, 110B. Communication links 110A, 110B can use various communication media, such as air, space, metal, optical fiber, or some other signal propagation path—including combinations thereof. Communication links 110A, 110B may comprise many different signals sharing the same link. Communication links 110A, 110B could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link, but be transferred over different communication sessions, frequencies, timeslots, packets, ports, sockets, logical transport links, or in different directions—including combinations thereof.

Communication links 110A, 110B are wireless links that use various communication protocols such as, for example, Internet, Internet protocol (IP), local-area network (LAN), optical networking, hybrid fiber coax (HFC), telephony, T1, or some other communication format, including combinations, improvements, or variations thereof. Although the communication links 110A, 110B are depicted between only wireless device 102 and access node 104, any wireless device may be linked to access node 104 via a communication link. According to an exemplary embodiment, wireless communication links can be, for example, a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used than those specified in the various exemplary embodiments described herein. Link 110A, 110B can be a direct link or may include various equipment, intermediate components, systems, and networks, according to an exemplary embodiment.

Wireless device 102 can communicate information over system 100 using various communication services. These services can include various voice and/or data services and applications. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access node 104 can be any network node configured to provide communication between wireless device 102 and communication network 108. For example, access node 104 can be selected from a base transceiver station, a radio base station, an eNodeB device, or an enhanced eNodeB device, or the like. It is noted that while only one access node 104 is illustrated in FIG. 1, any number of access nodes can be implemented within system 100.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Controller node 106 can be any network node configured to communicate information or control information over system 100. Controller node 106 can be a standalone computing device, computing system, or network component, and can be accessible, for example, by a wired or wireless connection, or through an indirect connection such as through a computer network or communication network. For example, controller node 106 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 106 is not limited to any specific technology architecture, such as Long Term Evolution (LTE) and can be used with any network architecture and/or protocol.

Controller node 106 can comprise a processor and associated circuitry to execute or direct the execution of computer-readable instructions to obtain information. Controller node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 106 can receive instructions and other input at a user interface.

Controller node 106 can be in communication with access node 104 through communication link 112. Access node 104 can be in communication with communication network 108 through communication link 114. Communication links 112, 114 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 112, 114 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment.

Communication network 108 can be capable of carrying data, for example, to support voice, push-to-talk, broadcast video, and data communications by a wireless device, such as wireless devices 102. Wireless network protocols can comprise, for example, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX). Wired network protocols that may be utilized by communication networks 108 comprise, for example, Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). According to an exemplary embodiment, communication network 108 can also comprise additional base stations, controller nodes, telephony switches, internet routers, network gateways, computer systems, communication links, or other types of communication equipment, and combinations thereof.

Carrier aggregation involves the provisioning of secondary carriers for the wireless device 102. A secondary carrier is provided to the wireless device after the wireless device establishes communication with an access node using a primary component carrier (PCC). The PCC is employed by the access node and wireless device to provide the secondary carrier to the wireless device. Accordingly, the cell associated with the PCC is commonly referred to as a primary cell or PCELL and the cell associated with the secondary carrier is commonly referred to as the SCELL. The secondary carrier provides additional bandwidth for the wireless device.

The PCC and secondary carrier are at centered different frequencies and may or may not have the same bandwidth. The PCC and secondary carrier may also be contiguous or non-contiguous. That is, with contiguous carriers, the lowest frequency of one of the carriers (e.g., PCC) may abut the highest frequency of another carrier (e.g., secondary carrier). In addition, more than two carriers may be provided. For example, four secondary carriers may be provided in addition to the PCC. Accordingly, the wireless device 102 is configured to communicate with the access node 104 using more than one carrier. Such wireless devices are commonly referred to as CA enabled.

Wireless device 102 is mobile and can therefore move through various PCELLS. More specifically, the wireless device 102 can transfer from a serving access node to a target access node, each of which has an associated PCELL. The target access node detects that the wireless device 102 is a CA enabled wireless device and provisions one or more secondary carriers for the CA enabled wireless device 102. The provisioned secondary carriers form the SCELLs, which more or may not have the same size, orientation, coverage, etc., as the PCELL. SCELLs can be provisioned by the same access node that provides the PCELL or by other nodes. For example, relay nodes in communication with the access node could be directed by the access node to provide the SCELL to the wireless device. Once provided, carrier aggregation may be utilized when the wireless device's buffer rises and exceeds a predefined threshold value.

The communication links 110A, 110B may respectively be a PCC and secondary carrier. For example, the communication link 110A may be a PCC provided by the access node 104. The communication link 110B may be a secondary carrier provided by the access node 104. The communication link 110A may therefore be employed for communication between the wireless device 102 and the access node 104 until, for example, a buffer threshold is exceeded.

The communication link 110B may then be employed to provide additional bandwidth to the wireless device 102. However, if the wireless device 102 is a high mobility wireless device, then carrier aggregation may be denied.

Figure 2:
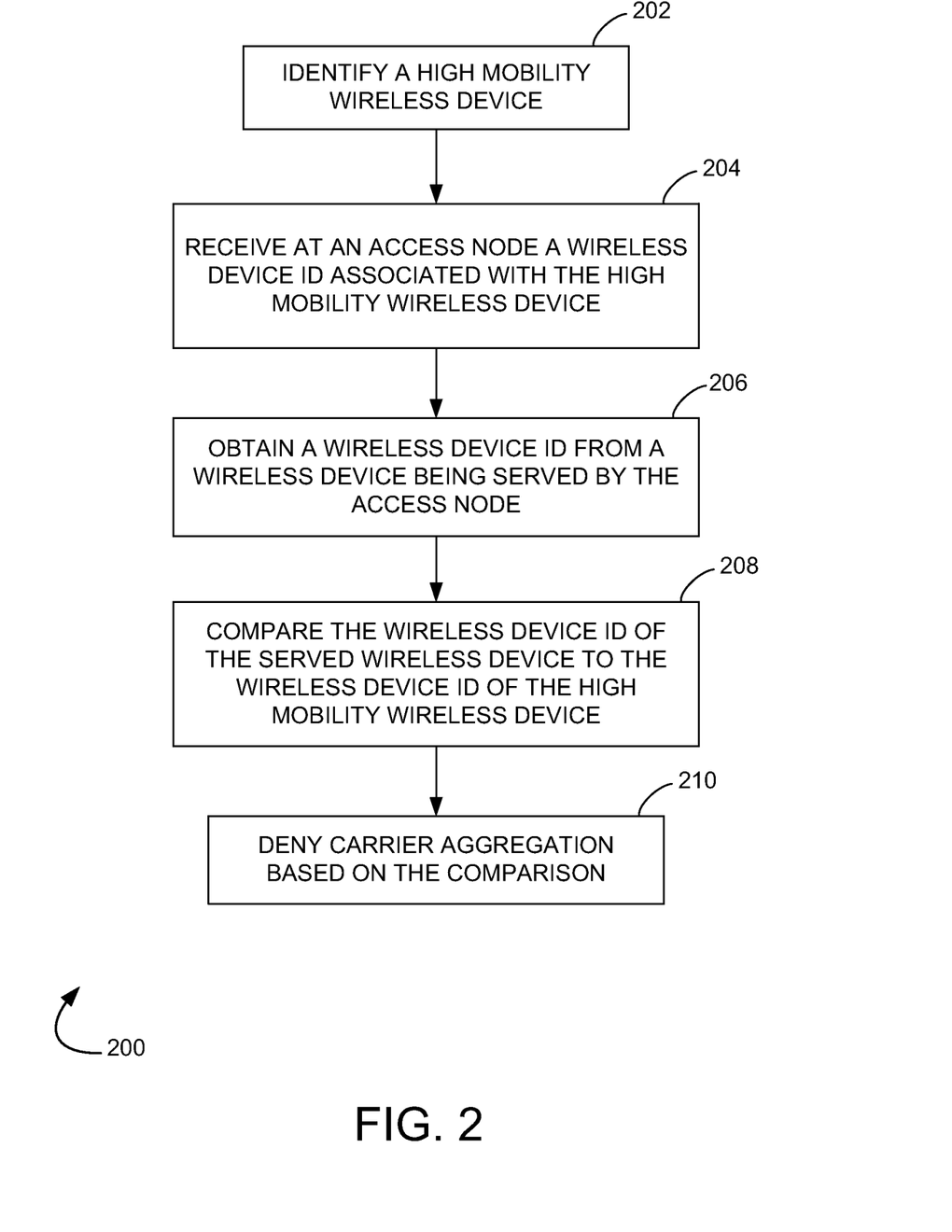
FIG. 2 illustrates a method of limiting carrier aggregation for a wireless device.

FIG. 2 illustrates a method 200 of limiting carrier aggregation for a wireless device. At method step 202, a high mobility wireless device is identified. The high mobility wireless device may be identified based on a number of carrier aggregation messages provided for the high mobility wireless device. The carrier aggregation messages may be provided for the wireless device 102 each time the wireless device 102 is transferred to a new serving cell. As a result, the high mobility wireless device will have a relatively high number of transfers in a short period of time. Accordingly, a relatively high number of carrier aggregation messages will be provided for a high mobility wireless device.

At method step 204, the access node 104 may receive the wireless device ID associated with the high mobility wireless device. For example, the access node 104 may receive the wireless device ID associated with the high mobility wireless device from a network node in the communication network 108. The wireless device ID associated with the high mobility wireless device can also be received by a plurality of access nodes proximate the access node 104, as described in the following with reference to FIG. 4.

Still referring to FIG. 2, at step 206, the access node 104 obtains the wireless device ID 103 from the wireless device 102 being served by the access node 104. The wireless device ID 103 may be obtained over the communication link 110A, which is associated with the PCELL serving the wireless device 102. The wireless device ID 103 may be obtained by the access node 104 when the wireless device 102 transfers (e.g., handover, cell reselection, etc.) to the access node 104. The wireless device ID 103 may also be obtained at any other time.

At step 208, the wireless device ID 103 of the served wireless device 102 is compared to the wireless device ID associated with the high mobility wireless device. For example, the access node 104 could compare the wireless device ID 103 obtained from the served wireless 102 with the wireless device ID associated with an identified high mobility wireless device to determine if they are the same. If the two wireless device IDs are the same, the comparison indicates that the served wireless device 102 is the high mobility wireless device.

At step 210, carrier aggregation may be denied based on the comparison. For example, as discussed in the foregoing, the comparison may indicate that the wireless device ID 103 of the served wireless device 102 is the same as the high mobility wireless device identified in step 202. Since the wireless device 102 is indicated as being the high mobility wireless device, as determined at step 202, carrier aggregation is denied to the served wireless device 102. The denial may be made for a period of time by the access node 104 as well as other access nodes, as the following explains.

The carrier aggregation messages may be provided for the wireless device 102 as it travels through a plurality of access nodes that include the access node 104. For example, the access node 104 may be in a plurality of access nodes that provide a number of carrier aggregation messages for the high mobility wireless device. The plurality of access nodes are in communication with another network node, which can determine the number of carrier aggregation messages provided for the high mobility wireless device, as described in more detail in the following with reference to FIGS. 3A, 3B, and 4.

Figure 3A:
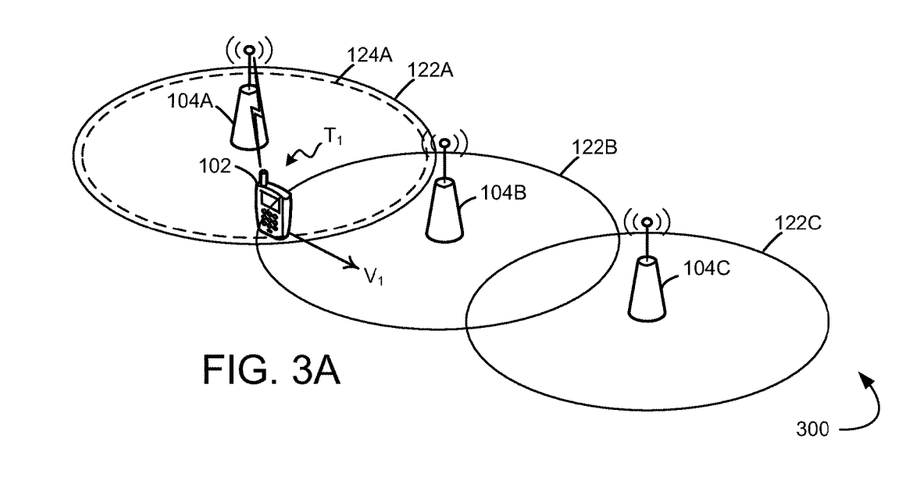
FIGS. 3A and 3B illustrate a wireless device moving through a plurality of cells associated with access nodes.
Figure 3B:
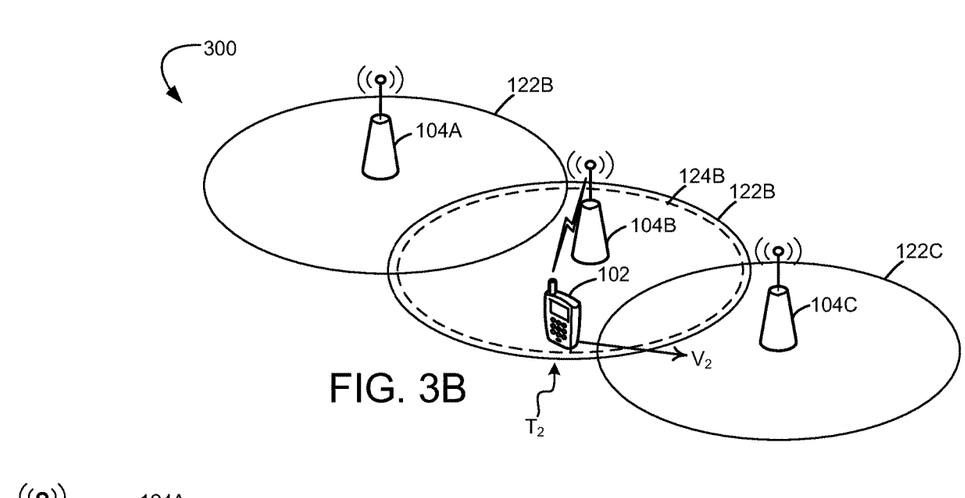

FIGS. 3A and 3B illustrate a wireless device 102 moving through a plurality of PCELLS associated with access nodes. The wireless device 102 moves through the plurality of PCELLS 122A-122C associated with the access nodes 104A-104C with a first and second velocity $V_1$, $V_2$. When the wireless device 102 is transferred between the access nodes 104A-104C, the wireless device 102 may be identified by the target access node 104A-104C as a CA enabled wireless device. Accordingly, access node 104A, 104B can provide an SCELL 124A, 124B to the wireless device 102.

In FIG. 3A, the wireless device 102 is in communication with a first access node 104A of the plurality of access nodes 104A-104C. The wireless device 102 is a CA enabled wireless device being served by the first access node 104A in a first PCELL 122A and a first SCELL 124A. Accordingly, the wireless device 102 is communicating with the first access node 104A via the first and second communication links 110A, 110B. The wireless device 102 is moving towards a second access node 104B with the first velocity $V_1$ when the wireless device 102 transfers to the second access node 104B. The transfer occurs at a first time $T_1$.

In FIG. 3B, the wireless device 102 has transferred to the second access node 104B. The wireless device 102 is shown as being in a second PCELL 122B associated with the second access node 104B. A second SCELL 124B is provided at a second time $T_2$. When the second SCELL 124B is provided at the second time $T_2$, the wireless device 102 is proximate to and moving towards a third access node 104C with a second velocity $V_2$.

As can be appreciated, carrier aggregation is activated for a relatively small portion of the wireless device's 102 traversal through the second PCELL 122B. As can also be appreciated, how long the carrier aggregation is provided by each of the access nodes 104A-104C depends on the velocity, position, and path (e.g., cell edge, center, etc.) of the wireless device 102. These and other factors, such as the position of the access nodes 104A-104C, are discussed in more detail in the following with reference to FIG. 4.

Figure 4:
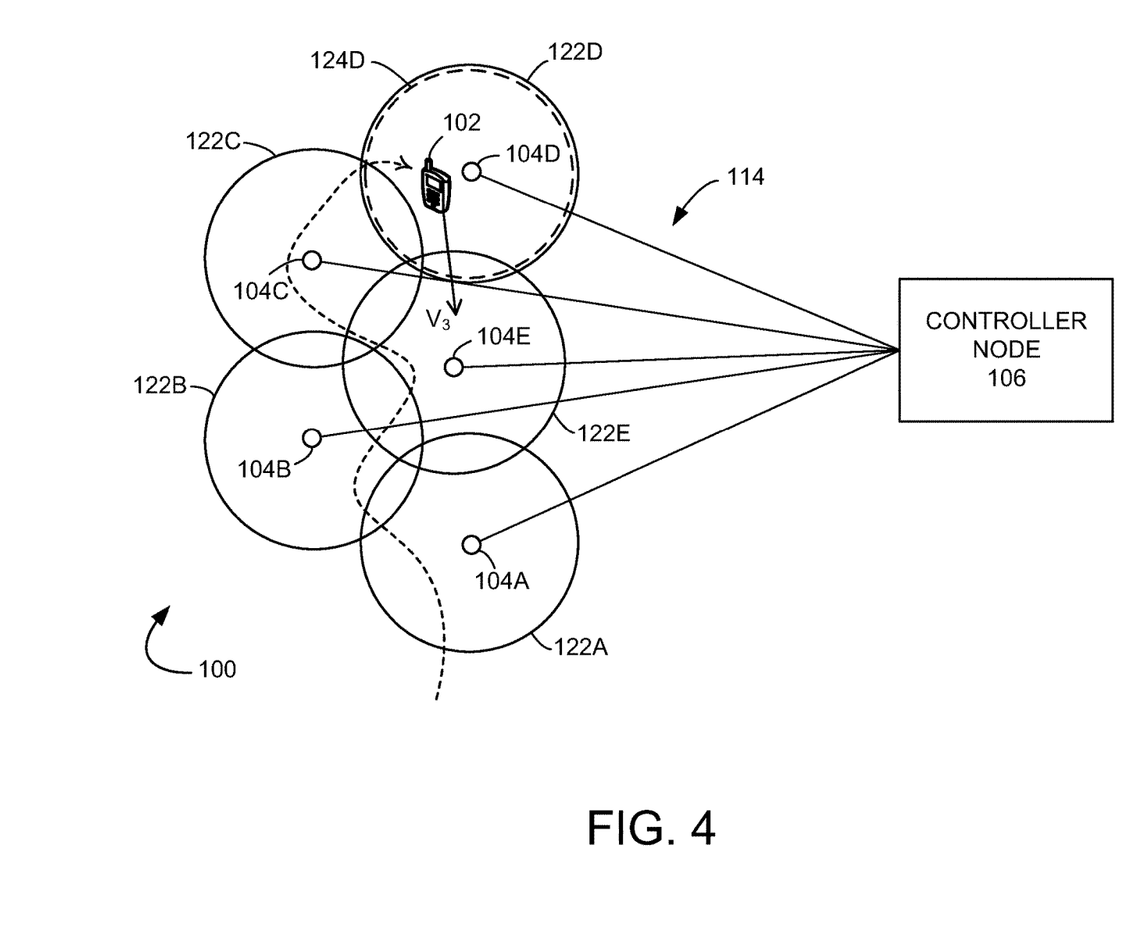
FIG. 4 illustrates a wireless device moving through a plurality of cells.

FIG. 4 illustrates a wireless device 102 moving through a plurality of cells. The wireless device 102 is shown in a fourth PCELL 122D and SCELL 124D. The wireless device 102 is in the fourth PCELL 122D and SCELL 124D after traversing the first through third PCELLs 122A-122C. As can be appreciated, the traversal (illustrated by the dashed line) through each of the PCELLs 122A-122C may be relatively short.

For example, the traversal of the wireless device through the second PCELL 122B is shorter than the traversal through the first PCELL 122A. However, due to the velocity of the wireless device 102, the carrier aggregation may also be active in the first PCELL 122A for a relatively short period of time. While in the second PCELL 122B, the wireless device traverses a smaller portion of the second PCELL 122B, but may have a smaller velocity. Accordingly, carrier aggregation may be activated for a short period of time due to the smaller velocity despite the relatively short traversal through the second PCELL 122B.

Each time the SCELL 124A-124C is activated, a network node, such as the controller node 106, may obtain the wireless device ID 103 from the wireless device 102 via the communication links 114. Other communication links may also be employed, such as communication links (not shown) between the access nodes 104A-104E (e.g., via X2 interfaces in LTE), or a combination thereof. The location of the wireless device 102 may also be obtained. For example, each of the access nodes 104A-104D may provide an access node identifier, GPS coordinate, or other similar information, to the controller node 106. The information may also be associated with the time that the carrier aggregation message is provided for the wireless device 102.

A velocity $V_3$ of the wireless device 102 may also be obtained. The velocity $V_3$ may be comprised of the speed of the wireless device. The velocity $V_3$ of the wireless device 102 may also include a direction of the wireless device 102, such as a direction towards a GPS coordinate, one of the access nodes 104A-104D or PCELLs 122A-122D, or the like. The direction of the velocity $V_3$ shown in FIG. 4 is towards the fifth access node 104E. The velocity $V_3$ indicates that the fifth access node 104E may provide a carrier aggregation message for the wireless device 102 sometime in the future.

A network node, such as the controller node 106, may use the number of carrier aggregation messages, position, and/or velocity of the wireless device 102 to identify the wireless device 102 as a high mobility wireless device. For example, the number of carrier aggregation messages sent by the access nodes 104A-104D may meet or exceed a carrier aggregation threshold. This may be sufficient for the network node to identify the wireless device 102 as a high mobility wireless device. The network node may also consider the velocity and/or the position of the wireless device 102 to identify the wireless device 102 as a high mobility wireless device.

The network node can provide the wireless device ID 103 associated with the wireless device 102, which is identified as a high mobility wireless device, to a plurality of access nodes proximate the fourth access node 104D. The network node can also provide a period of time that the wireless device 102 is to be denied carrier aggregation. For example, carrier aggregation may be denied for ten minutes from the time the controller node 106 sends the message to deny carrier aggregation. Other periods can be employed in alternative embodiments.

The plurality of access nodes proximate the fourth access node 104D may include adjacent or non-adjacent access nodes. For example, the plurality of access nodes proximate the fourth access node 104D may include the third and fifth access node 104C, 104E, as well as other adjacent access nodes that are not shown. However, the plurality of access nodes proximate the fourth access node 104D may also include non-adjacent access nodes, such as the first and second access nodes 104A, 104B.

As shown in FIG. 4, the wireless device 102 is moving towards the fifth access node 104E. When the wireless device 102 transfers to the fifth access node 104E, the fifth access node 104E may obtain the wireless device ID 103 from the wireless device 102. The fifth access node 104E can compare the wireless device ID 103 with the wireless device ID associated with a previously identified high mobility wireless device. The comparison may indicate that the wireless device 102 being served by the fifth access node 104E is a high mobility wireless device. Accordingly, the fifth access node 104E will deny carrier aggregation to the wireless device 102. The denial may be for the period of time provided by the network node.

Carrier aggregation messages between the access node 104 and the network node may occur through activation messages. For example, the access node 104 can send CA-Activation/CA-DeActivation messages containing the wireless device ID 103 (e.g., MACID IMSI), time of day, access node location and ID information (e.g., latitude and longitude), and/or velocity of the wireless device to the controller node 106. The controller node 106 can broadcast a CA-Activation=DENIED to a plurality of access nodes.

The CA-Activation=DENIED can be broadcast with an expiration time (e.g., ten minutes) during which carrier aggregation for a high mobility wireless device is to be denied. The plurality of access nodes can receive the CA-Activation=DENIED and deny activation of the carrier aggregation for the wireless device ID associated with a high mobility wireless device.

Figure 5:
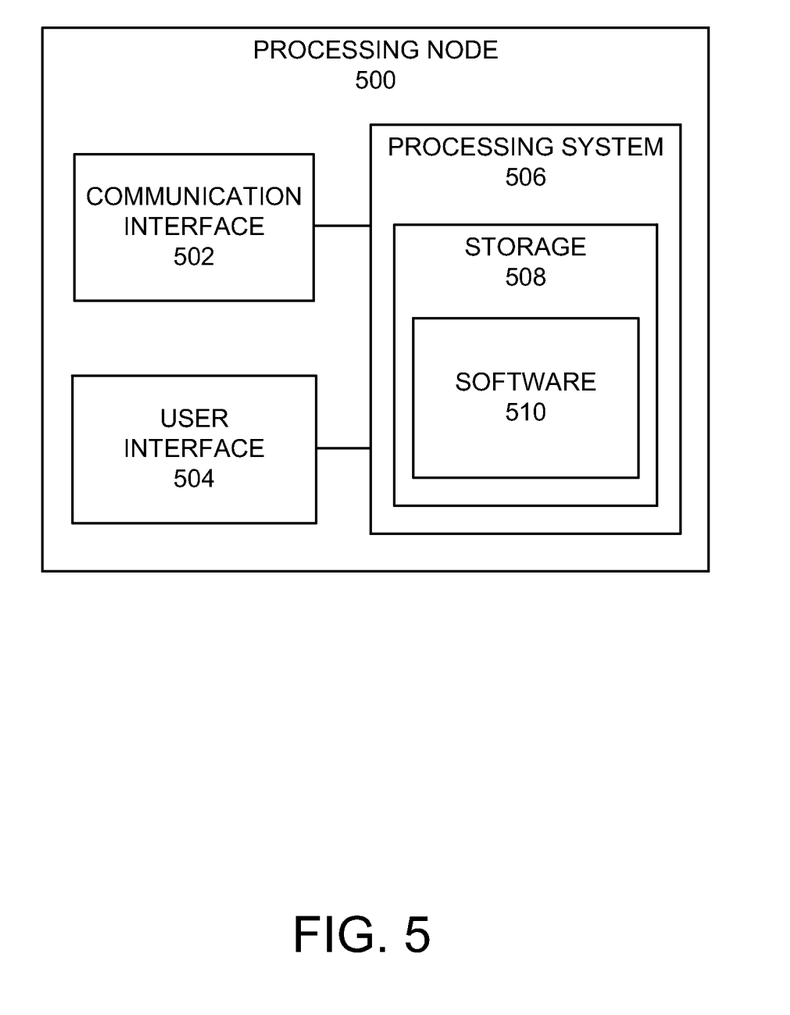
FIG. 5 illustrates an exemplary processing node in a communication system.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 104 and controller node 106. Processing node 500 can also be an adjunct or component of a network element, such as an element of access node 104 and controller node 106. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for limiting carrier aggregation for a wireless device, the method comprising:
identifying a high velocity wireless device based on a number of carrier aggregation messages provided for the high velocity wireless device;
comparing the number of carrier aggregation messages with a carrier aggregation threshold;
receiving at an access node a wireless device ID associated with the high velocity wireless device;
obtaining a wireless device ID from a wireless device being served by the access node;
comparing the wireless device ID of the served wireless device to the wireless device ID of the high velocity wireless device; and
denying carrier aggregation to the served wireless device when the wireless device ID of the served wireless device is the same as the wireless device ID associated with the high velocity wireless device.

2. The method of claim 1, wherein the number of carrier aggregation messages is provided by at least one of a plurality of nodes proximate the access node.

3. The method of claim 1, wherein identifying the high velocity wireless device is further based on a velocity of the high velocity wireless device.

4. The method of claim 1, further comprising identifying the access node serving the wireless device and identifying a plurality of access nodes proximate the access node serving the wireless device.

5. The method of claim 1, further comprising providing the wireless device ID associated with the high velocity wireless device to a plurality of access nodes proximate to the access node serving the served wireless device.

6. A method for limiting carrier aggregation for a wireless device, the method comprising:
obtaining a wireless device ID from a wireless device;
determining a number of carrier aggregation messages associated with the wireless device ID;
comparing the number of carrier aggregation messages with a carrier aggregation threshold;
based on the comparison, identifying the wireless device as a high velocity wireless device;
obtaining a wireless device ID from a wireless device being served by the access node;
comparing the wireless device ID of the served wireless device to the wireless device ID of the high velocity wireless device; and
denying carrier aggregation to the served wireless device when the wireless device ID of the served wireless device is the same as the wireless device ID associated with the high velocity wireless device.

7. The method of claim 6, further comprising obtaining a location of the wireless device in a plurality of access nodes.

8. The method of claim 6, further comprising obtaining a velocity of the wireless device and determining that the wireless device is a high velocity wireless device based on a velocity of the wireless device.

9. The method of claim 6, further comprising providing the wireless device ID to a plurality of access nodes proximate the access node serving the wireless device.

10. The method of claim 6, further comprising providing a period of time that the wireless device is to be denied carrier aggregation to a plurality of access nodes proximate the access node serving the wireless device.

11. A system for limiting carrier aggregation for a wireless device, the system comprising:
   an access node configured to obtain a wireless device ID from a wireless device being served by the access node;
   a network node in communication with the access node, the network node being configured to:
      determine a number of carrier aggregation messages associated with the wireless device ID;
      compare the number of carrier aggregation messages with an aggregation threshold;
      based on the comparison, determine that the wireless device is a high velocity wireless device;
      compare the wireless device ID of the served wireless device to the wireless device ID of the high velocity wireless device; and
      deny carrier aggregation to the served wireless device when the wireless device ID associated with the served wireless device is the same as the wireless device ID associated with the high velocity wireless device.

12. The system of claim 11, wherein the access node is further configured to compare the wireless device ID associated with the served wireless device to the wireless device ID associated with the high velocity wireless device.

13. The system of claim 11, wherein the network node is further configured to determine the location of the wireless device in a plurality of access nodes.

14. The system of claim 11, wherein the network node is further configured to provide the wireless device ID associated with the high velocity wireless device to a plurality of access nodes proximate to the access node serving the wireless device.

15. The system of claim 11, wherein the network node is further configured to provide a period of time that the high velocity wireless device is to be denied access to a plurality of access nodes proximate the access node.

16. The system of claim 11, wherein the network node is further configured to determine that the wireless device is a high velocity wireless device based on a velocity of the high velocity wireless device.

* * * * *